No. 707,573. Patented Aug. 26, 1902.
J. M. FLEMING.
CENTERING ATTACHMENT FOR LATHES.
(Application filed Oct. 17, 1901.)
(No Model.)

Witnesses.
E. P. Featherstonhaugh
E. N. White

Inventor.
J. M. Fleming
by Featherstonhaugh & Co.
Attys

UNITED STATES PATENT OFFICE.

JOHN MILLER FLEMING, OF OTTAWA, CANADA, ASSIGNOR OF ONE-HALF TO WILLIAM BOTHWELL, OF OTTAWA, CANADA.

CENTERING ATTACHMENT FOR LATHES.

SPECIFICATION forming part of Letters Patent No. 707,573, dated August 26, 1902.

Application filed October 17, 1901. Serial No. 78,989. (No model.)

*To all whom it may concern:*

Be it known that I, JOHN MILLER FLEMING, machinist, of the city of Ottawa, in the county of Carleton, in the Province of Ontario and Dominion of Canada, have invented a new and useful Centering Attachment for Lathes, of which the following is a specification.

My invention relates to improvements in centering attachments for lathes; and the object of my invention is to devise an attachment for lathes by means of which a hole may be bored in the exact center of the end of a piece of work to be turned on a lathe for the center point of the lathe, further objects being to make such a device simple and cheap in construction and positive in its action; and it consists, essentially, of a cup-shaped portion with means for securing the same to the tailpiece of the lathe while permitting of its rotation, a central drill being provided having means for adjusting it in a forward or backward direction and means for preventing its rotation, the various parts being constructed and arranged in detail as hereinafter more particularly described.

Figure 1:
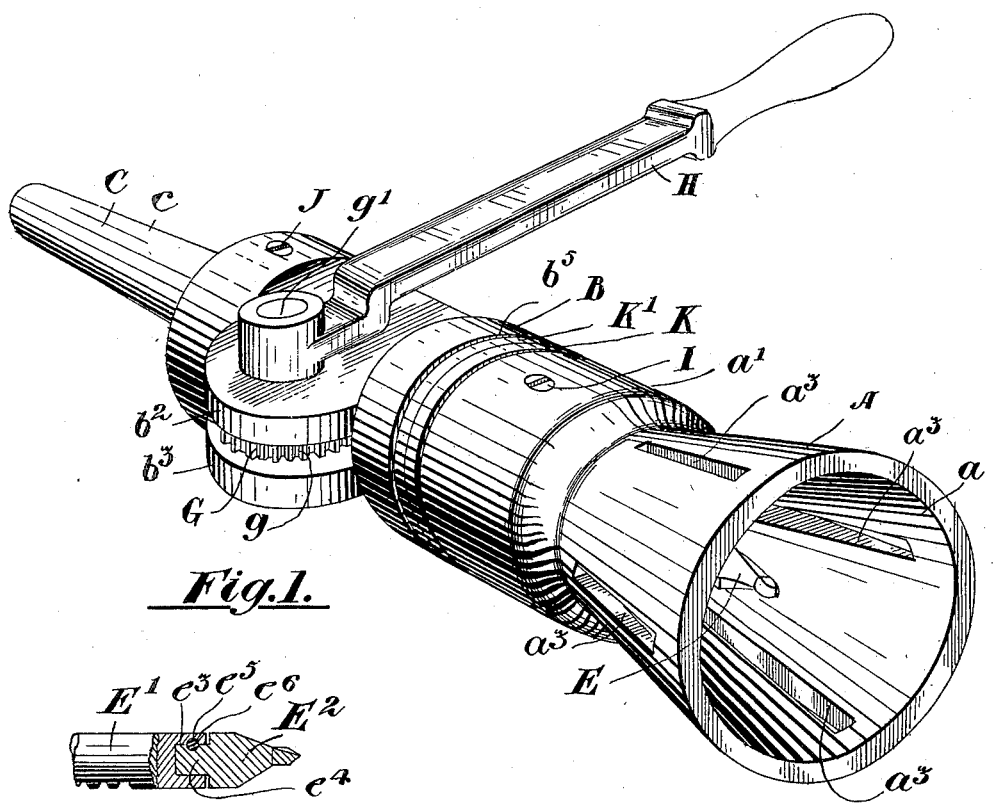
Figure 3:
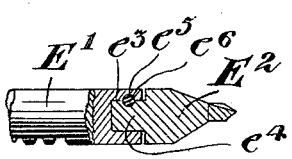
Figure 2:
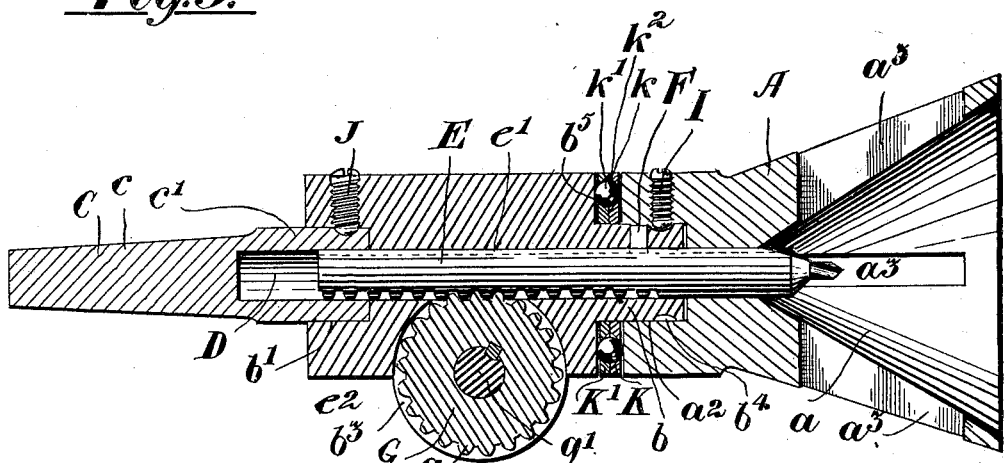

Figure 1 is a perspective view of my attachment. Fig. 2 is a sectional view of the same. Fig. 3 is a detail of an alternative form of drill which may be used in connection with my device.

In the drawings like letters of reference indicate corresponding parts in each figure.

A is the rotatable portion comprising the cup-shaped portion $a$ and a cylindrical portion $a'$, in which is a central hole $a^2$.

B is the body of the device, which is substantially cylindrical in form and is provided with an outwardly-extending reduced cylindrical portion $b$, designed to fit in the hole $a^2$. At its opposite end the body of the device is formed with an inwardly-extending central circular hole or depression $b'$.

C is a supporting-piece having a tapered portion $c$ to fit in and secure the device to the tailpiece of the lathe and also having a cylindrical portion $c'$, designed to fit in the hole or depression $b'$ in the body of the device. A central longitudinal hole D is formed continuously in the supporting-piece C, the body B, and the rotatable portion A. A suitable drill E is provided and inserted in this longitudinal hole and held from turning therein preferably by means of a stop F, of any suitable form, which is inserted in a slot $e'$, formed in the drill.

Any suitable means may be provided for advancing or withdrawing the drill E; but the means which I prefer to employ is as follows: Teeth $e^2$ are formed on the drill E. A pinion G is provided having teeth $g$, designed to engage the teeth $e^2$ of the drill E. This pinion is secured on a suitable shaft $g'$, which is journaled in lugs $b^2$ $b^3$, formed on and extending outwardly from the body portion B.

A lever, crank, or handle of any suitable form is provided for rotating the pinion G. I prefer, however, to employ for this purpose a lever H, which is firmly secured to the shaft $g'$.

In order to prevent the conical cup from slipping off the end of the cylindrical reduced portion $b$ of the body B and in order to permit of its free rotation thereon, a slot or groove $b^4$ is formed in the circumference of the cylindrical portion $b$, and a screw I is provided and is screwed through the cylindrical portion $a$ in such a position as to just enter the groove $b^4$. The supporting-piece C is held securely in the body B by means of a suitable set-screw J. It will thus be seen that the tapered portion C of the device may be jammed into the tailpiece of the lathe, and this will hold the body portion of the attachment rigidly with its axis coinciding with the axis of the lathe, so that if a piece of shafting or other round or symmetrical material be attached to the head-stock in the ordinary way and its opposite end be inserted in the cup $a$ as soon as the lathe is started the work will turn, and owing to the friction between the end of the piece of work and the cup $a$ the rotatable portion will be caused to rotate. The drill E, which does not rotate, may now be advanced and will drill a hole into the end of the work, and owing to the conical shape of the cup this hole will of necessity be in the exact center of the end of the piece of work. A thrust-bearing is provided between the end of the cyndrical part $a'$ of the rotatable portion A and the shoulder $b^5$ of the body portion B. This bearing may consist simply of a ring of brass or other material; but for small work I prefer to provide ball-bearings at this point, which are constructed, preferably, as follows: Circular rings K and K' are provided having holes $k$ and $k'$, in which are inserted steel balls $k^2$, the diameter of which is slightly greater than the combined thicknesses of the two rings K and K'.

In order to give the work the best possible grip in the cup, a plurality of slots $a^3$ may be formed therein, the edges of which will cause a greater friction between the work and the cup.

A separate tip or bit for the drill may be provided and secured to the toothed portion or stock by any suitable means. I have shown one method of securing such a tip to the stock in Fig. 3, in which E' is the toothed drill-stock, and $E^2$ is the bit. The stock E' is provided with a hole or recess $e^3$, and the bit has a corresponding extension $e^4$. A hole $e^5$ is bored through the stock at the edge of the hole $e^3$ and through the edge of the extension $e^4$, and a locking-pin $e^6$ is inserted therein to hold the bit in place. When a point breaks, all that is necessary is to remove the bit and regrind it or to replace the bit with a new one, and the toothed portion or stock will last indefinitely.

In centering a piece of work with my device all that is necessary is to secure one end of the work to the head of the lathe and insert the other end in a cup $a$. The work is then rotated, the drill is advanced, and the hole is drilled and countersunk in the exact center of the work, and it will thus be seen that the time which it takes to drill a hole will be greatly reduced by the use of my device.

It will of course be understood that although the cup-shaped portion of my device is shown and described as conical it may be made flaring or of other curved form without departing from the spirit of my invention; also, I might provide cups of a variety of cross-sections for other than circular stock, the essential feature of the cup being that its internal diameter must be largest at its mouth and gradually get shorter toward the inner portion of the cup. It will also be understood that certain other mechanical equivalents might be substituted for the various parts of the device without departing from the spirit of my invention, such as a worm-and-rack gear in place of the pinion-and-rack gear for advancing and withdrawing the drill; also, the body and the supporting part of the device might be made in one piece; but the construction and form shown is that which I consider preferable in practice.

I am aware that it is not new to use a conical or funnel-shaped cup for the purpose of centering work to be turned on a lathe; but in my device the said cup is rotatably secured to the body portion in such a manner that it may be readily removed and a larger cup substituted therefor, if it be desirable, and this point of advantage has not been attained in any other centering device. It may further be pointed out that the means which I have devised for securing the cup rotatably to the body of the device is extremely cheap in construction, as only one extra part—namely, the screw I—is necessary, and in previous constructions at least three additional parts were required.

What I claim as my invention is—

1. In combination, a body portion having a cylindrical extension at the front end, a cup-shaped portion having its rear end rotatably mounted on said cylindrical extension, a supporting-piece at the rear of said body portion, said cup-shaped portion, body portion and supporting-piece having an axial passage, a drill longitudinally movable in said passage, means for holding the same against rotary movement relative to the body, and means for advancing and retracting the drill substantially as described.

2. In combination, the body portion having a cylindrical extension at the front end with a circumferential groove formed thereon, a cup-shaped portion having its rear end rotatably mounted on said cylindrical extension, a key extending through the rear end of said cup-shaped portion and into said groove, a supporting-piece at the rear end of said body portion, said cup-shaped portion, body portion and supporting-piece having an axial passage, a drill longitudinally movable in said passage, means for holding the same against rotary movement relative to the body, and means for advancing and retracting the drill, substantially as described.

Signed at the city of Ottawa this 9th day of October, 1901.

JOHN MILLER FLEMING.

Witnesses:
E. P. FETHERSTONHAUGH,
F. W. SMITH.